W. I. VARNER.
INTERCHANGEABLE TIRE TREAD.
APPLICATION FILED MAR. 31, 1917.
1,265,556.
Patented May 7, 1918.
2 SHEETS—SHEET 1.
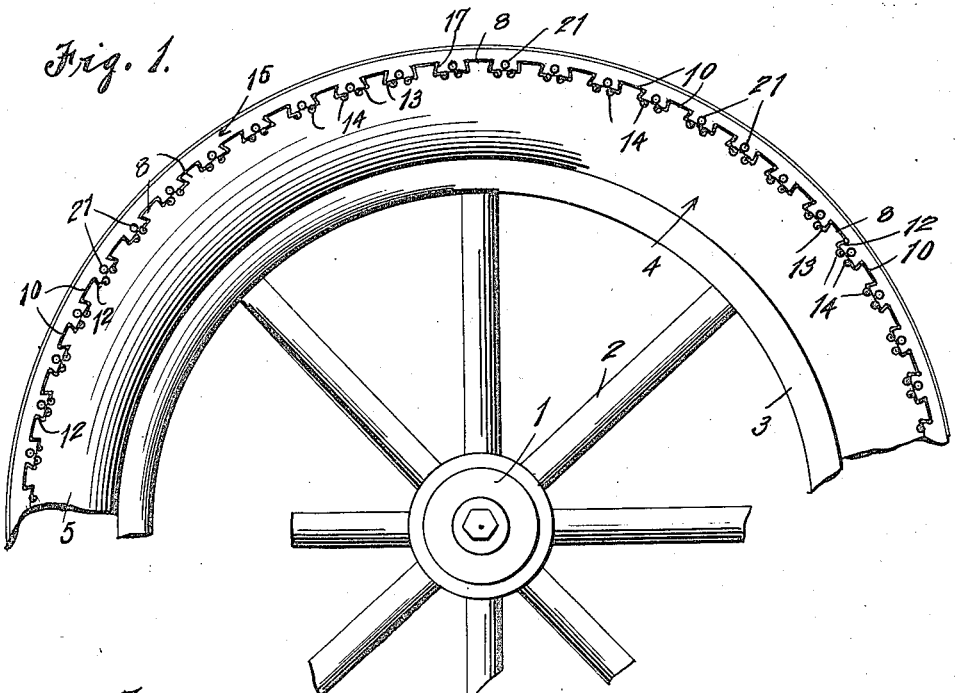
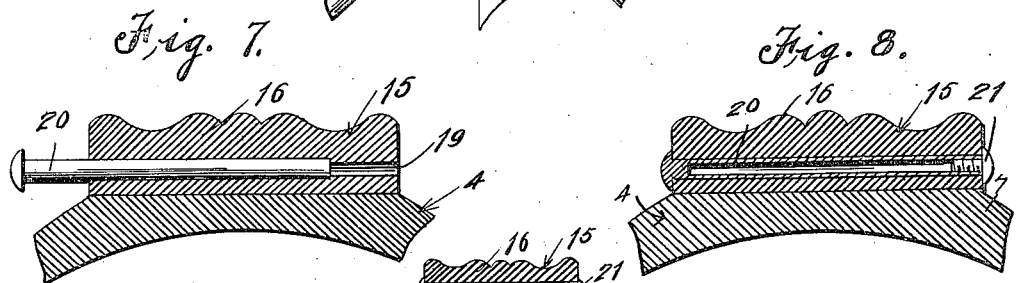
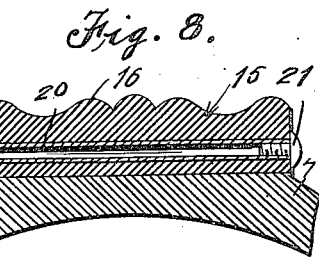
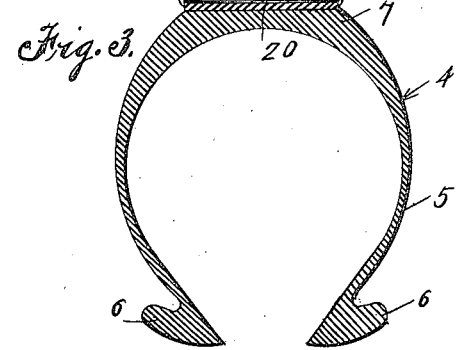
Inventor
W. I. Varner.

W. I. VARNER.
INTERCHANGEABLE TIRE TREAD.
APPLICATION FILED MAR. 31, 1917.
1,265,556.
Patented May 7, 1918.
2 SHEETS—SHEET 2.
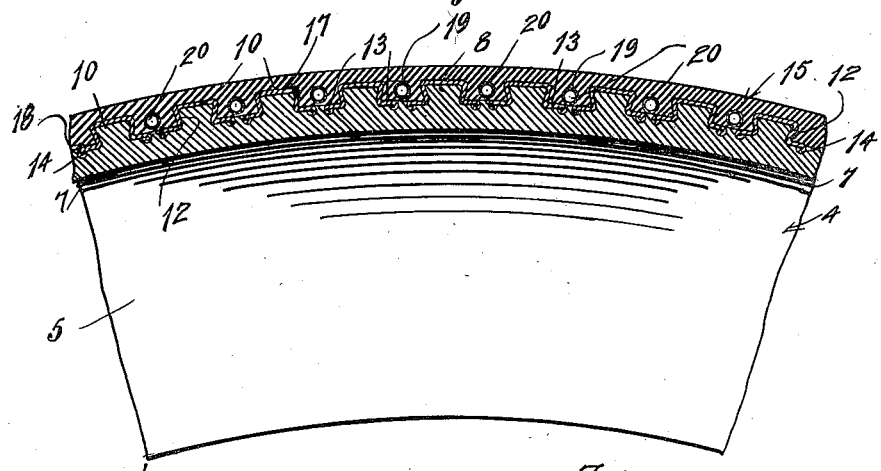
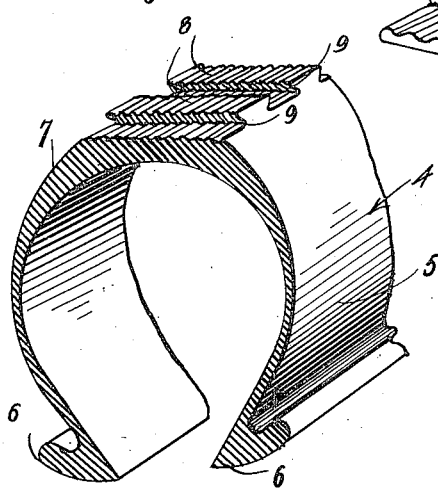
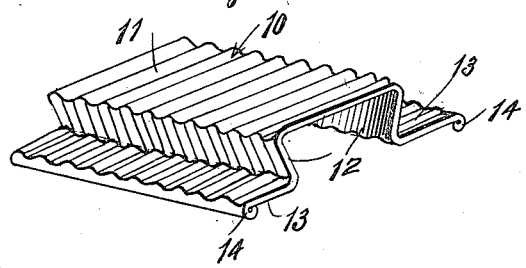
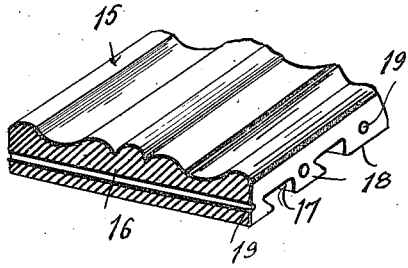
Inventor
W. I. Varner

UNITED STATES PATENT OFFICE.

WILLIAM I. VARNER, OF ATHENS, GEORGIA.

INTERCHANGEABLE TIRE-TREAD.

1,265,556.  Specification of Letters Patent.  Patented May 7, 1918.

Application filed March 31, 1917. Serial No. 158,864.

*To all whom it may concern:*

Be it known that I, WILLIAM I. VARNER, a citizen of the United States, residing at Athens, in the county of Clarke and State of Georgia, have invented certain new and useful Improvements in Interchangeable Tire-Treads; and I do hereby declare the following to be a full, clear, and exact description of the invention, such as will enable others skilled in the art to which it appertains to make and use the same.

This invention relates to new and useful improvements in interchangeable tire treads, and the principal object of the invention resides in the provision of a tire having a removable tread which is so arranged that it may be readily removed and a new tread placed in position on the tire when the same becomes worn.

Another object of the invention is to provide a tire having a plurality of shields or plates interposed between the tread and the tire body so as to prevent the tire from being punctured.

A further object of the invention is to provide a tire in which the shields are so arranged as to coöperate with the tread in holding the same in place.

Still another object of the invention resides in the provision of tubes extending transversely of the tire between the plates, which tubes serve to fill the space between the adjacent edges of the plates in order to give the effect of a continuous strip of metal and yet prevent the flexibility of the tire from being interfered with and also serve as a securing means by which the tread is locked in place.

With these and other objects in view, the invention consists in the novel combination and arrangement of parts which will be fully set forth in the following specification and accompanying drawings, in which:—

Figure 1 is a fragmentary side view of a wheel and tire showing the tire constructed in accordance with this invention with the tread in place;

Fig. 2 is a longitudinal sectional view through a fragment of the tire illustrating in detail the construction of the device;

Fig. 3 is a transverse sectional view through the tire;

Fig. 4 is a fragmentary detail perspective view of the tire body;

Fig. 5 is a fragmentary detail perspective view of the tire tread;

Fig. 6 is a detail perspective view of one of the shields or plates;

Fig. 7 is a fragmentary sectional view through an opening in the tread, showing one of the securing tubes partially inserted in the tread and illustrating the way the tread is expanded by said tube; and Fig. 8 is a view similar to Fig. 7 showing the tube in section and illustrating the screw entering the end thereof, by which the tube is held against accidental movement.

Referring to the drawings, 1 designates a wheel hub of the ordinary construction, provided with the usual radiating spokes 2 supporting at their outer ends the rim 3. The tire body is designated generically by the numeral 4 and comprises the side walls 5 provided with the usual beads 6 and united by the peripheral portion 7. The peripheral portion above referred to has formed integrally therewith a plurality of transversely extending dove tails 8 which are so arranged as to form dove tail grooves 9 into which the dove tails of the tread portion fit. The dove tails 8 are covered by the shield plates designated generically by the numeral 10 which are best illustrated in Fig. 6, each of which comprises a corrugated body 11 formed at opposite edges with the inwardly extending flanges 12 which conform to the shape of the walls of the grooves 9 and are provided at their lower ends with outturned flanges 13 which extend concentric with the plate 11. These outturned flanges 13 are adapted to engage the bottom wall of the grooves 9 and formed at the extreme edges of the flanges are beads 14 which are preferably embedded in the rubber of the tread portion 7 in order to securely hold the plates in position.

The removable tread which is best illustrated in Fig. 5 is designated by the numeral 15 and comprises an annular body 16 provided on its inner side with a plurality of transversely extending dove tail grooves 17 forming dove tails 18. As shown in Figs. 7 and 8, suitable transverse openings designated by the numeral 19 are formed in the dove tails 18 intermediate their edges, and these openings extend transversely through the tread portion and have fitted therein the tubes 20 which are of greater diameters than the openings so that when the tubes are forced through the openings, the rubber will be expanded into the corrugations of the plates 10, and thus securely lock the tread in place. After the tubes 20 have been put in place, suitable screws 21 are threaded into the open ends thereof and firmly lock said tubes against accidental movement.

In assembling the tire it will be seen that the tread is slipped onto the tread portion of the tire as illustrated in Figs. 1 and 2, so that the dove tails of the tire enter the dove tail grooves of the tread and the dove tails of the tread enter the dove tail grooves of the tire. After the tread has been put in proper position, the tubes 20 are forced through the openings 19 and thus cause the rubber of the tread portion 7 of the tire to expand against the corrugations of the plates 10 to lock said tread portion in place. After the tubes have been put in place, the screws 21 are screwed into the tubes to hold them from accidental withdrawal. In this way it will be seen that the tread will be firmly locked against accidental movement, and owing to the close position of the plates 10 and the fact that the tubes 20 extend between the plates so as to completely cover the spaces between the adjacent edges of said plates, it will be seen that any nail or sharp instrument entering the tread will either strike the plates or the tubes and be deflected, thus avoiding any injury to the tire and inner tube.

While in the foregoing there has been shown and described the preferred embodiment of this invention, it is to be understood that such changes may be made in the combination and arrangement of parts as will fall within the spirit and scope of the appended claims.

What is claimed is:—

1. A tire comprising a tire body, a plurality of transversely extending dove-tails formed on the periphery of the tire body, a tread, a plurality of inwardly extending transverse dove-tails formed on the inner surface of the tread and adapted to fit between the dove-tails of the tire body, and means extending through the dove-tails to expand the same whereby to prevent accidental displacement of the tread.

2. A tire comprising a tire body, a plurality of transversely extending dove-tails formed on the periphery of the tire body, a tread, a plurality of inwardly extending transverse dove-tails formed on the inner side of the tread and adapted to fit between the dove-tails on the tire body, and bolts extending through the last mentioned dove-tails to expand the same, as and for the purpose specified.

3. In a tire, a tire body, a plurality of transversely extending dove tails formed on the periphery of the tire body, a tread, a plurality of inwardly extending transverse dove tails formed on the inside of the tread and adapted to fit between the dove tails on the tire body to lock the tread and body against relative rotation, means to prevent the tread from moving off the body laterally, and metallic plates fitted over the dove tails on the tire body to prevent sharp instruments from entering the tire body.

4. In a tire, a tire body, a plurality of transversely extending dove tails formed on the periphery of the tire body, a tread, a plurality of inwardly extending transverse dove tails formed on the inside of the tread and adapted to fit between the dove tails on the tire body to lock the tread and body against relative rotation, means to prevent the tread from moving off the body laterally, metallic plates fitted over the dove tails on the tire body to prevent sharp instruments from entering the tire body, and transversely extending tubes in the tread and adapted to fill the spaces between the adjacent edges of the plates to prevent a sharp instrument from entering the tire body, and also to expand the tread against the tire body to lock said tread in place.

5. A tire comprising a tire body, a plurality of transversely extending dove tails formed on said tire body, a tire tread, a plurality of inwardly extending dove tails formed on said tire tread, the last dove tails being adapted to fit between the first dove tails, corrugated plates adapted to fit over the first mentioned dove tails, the last mentioned dove tails having relatively small openings therein, and relatively large tubes adapted to be forced into the openings in the last mentioned dove tails to cause the same to expand and force the rubber of the tread into the corrugations of the plates, to prevent the tread from moving laterally the said tubes also filling the spaces between the adjacent edges of the plates to prevent a sharp instrument from entering the tire.

6. In a tire, a tire body, a plurality of transversely extending dove-tails formed on the periphery of the tire body, a tread, a plurality of dove-tails formed on the tread and adapted to fit between the dove-tails of the tire body to lock the tread and body against relative rotation, said dove-tails being corrugated to prevent the tread from moving laterally off of the body.

In testimony whereof I affix my signature in presence of two witnesses.

WILLIAM I. VARNER.

Witnesses:
L. F. EDWARDS,
C. A. FOWLER.